US007028050B1

(12) United States Patent
Rose

(10) Patent No.: US 7,028,050 B1
(45) Date of Patent: Apr. 11, 2006

(54) DATA DISPLAY APPARATUS AND DATA DISPLAY METHOD

(75) Inventor: Tony Gerard Rose, Godalming (GB)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/523,313

(22) Filed: Mar. 10, 2000

(30) Foreign Application Priority Data

Apr. 15, 1999 (GB) .................................... 9908631

(51) Int. Cl.
G06F 17/30 (2006.01)
G06F 17/00 (2006.01)

(52) U.S. Cl. .................................... 707/104.1; 715/848
(58) Field of Classification Search ................ 345/655, 345/764, 848–854, 968, 419; 707/102, 3, 707/6, 101, 1–5, 104.1; 715/848–852, 968
See application file for complete search history.

(56) References Cited

U.S. PATENT DOCUMENTS

| | | | |
|---|---|---|---|
| 4,716,404 A | 12/1987 | Tabata et al. ................ | 340/723 |
| 4,965,558 A | 10/1990 | Saki et al. ................... | 340/712 |
| 5,276,805 A | 1/1994 | Hamaguchi ................. | 395/164 |
| 5,493,677 A | 2/1996 | Balogh et al. .............. | 395/600 |
| 5,684,999 A | 11/1997 | Okamoto ..................... | 395/759 |
| 5,708,805 A | 1/1998 | Okamoto et al. ........... | 395/603 |
| 6,211,876 B1* | 4/2001 | Ackermann et al. ........ | 345/835 |
| 6,243,093 B1* | 6/2001 | Czerwinski et al. ........ | 345/848 |
| 6,405,195 B1* | 6/2002 | Ahlberg .......................... | 707/4 |
| 6,564,206 B1* | 5/2003 | Ikeda .............................. | 707/3 |
| 6,628,313 B1* | 9/2003 | Minakuchi et al. ......... | 715/853 |
| 6,721,733 B1* | 4/2004 | Lipson et al. .................. | 707/3 |

FOREIGN PATENT DOCUMENTS

WO WO 96/39670 12/1996

OTHER PUBLICATIONS

Zizi, Mountaz, "Interactive Dynamic Maps for Visualisation and Retrieval from Hypertext Systems", Information Retrieval and Hypertext, pp. 203-224 (1996).
Rubner, Yossi, et al., "Adaptive Color-Image Embeddings for Database Navigation", Lecture Notes in Computer Science, Computer Vision—ACCV '98, Third Asian Conference on Computer Vision, Hong Kong, China, Jan. 1998, Proceedings, vol. I, pp. 104-111 (Jan., 1998).
"Topic Graph Generation for Query Navigation: Use of Frequency Classes for Topic Extraction," Niwa, et al., Proceedings of NLPRS '97, Natural Language Processing Pacific Rim Symposium, Phuket, Thailand, pp. 95-100, 1997.

(Continued)

Primary Examiner—Frantz Coby
Assistant Examiner—Marc R. Filipczyk
(74) Attorney, Agent, or Firm—Fitzpatrick, Cella, Harper & Scinto.

(57) ABSTRACT

A data display apparatus and data display method for displaying relationships between sets of data are described. Sets of data and similarity values representing similarities between the sets of data are received, and a display is controlled to display representations for the sets of data separated in accordance with the similarity values and so as to display, in a first style, links between representations which correspond to sets of data having a strong similarity value and, in a second style, links between the representations which correspond to sets of data having a weak similarity value.

28 Claims, 12 Drawing Sheets

OTHER PUBLICATIONS

"Supporting Information Needs by Ostensive Definition in an Adaptive Information Space," Campbell, MIRO '95 Workshops in Computing, Springer Verlag, 1995.

"An Atlas of Cyperspace," located at http://www.cybergeography.org/atlas/atlas.html, Dec. 1998.

"The Geography of Cyberspace Directory," located at http://www.cybergeography.org/geography_of_cyberspace.html, Dec. 1998.

Beale, R., "Foreign Interactions", Interfaces 37, pp. 23-26 (1998).

"Data Mountain: Using Spatial Memory for Document Management," G. Robertson, t al., in Proceedings of ACM UIST '98 Symposium on User Interface Software & Technology, 1998, pp. 153-162.

John MacCuish, et al., "Interactive Layout Mechanisms for Image Database Retrieval", SPIE vol. 2656, pp. 104-115 (1996).

Alan F. Smeaton, et al., "Experiments on Using Semantic Distances Between Words in Image Caption Retrieval", 19th International Conference on Research and Development in Information Retrieval, pp. 174-180 (1996).

Mountaz Zizi, et al., "Hypermedia Exploration With Interactive Dynamic Maps", Academic Press Limited, pp. 441-464. (1995).

Yossi Rubner, et al., "A Metric For Distributions With Applications To Image Databases", IEEE 6th International Conference on Computer Vision, pp. 59-66 (1998).

Rohini K. Srihari, "Automatic Indexing and Content-Based Retrieval of Captioned Images", Computer Society, vol. 28, pp. 49-56 (1995).

Eick, et al., "Navigating Large Networks with Hierarchies" Proceedings Visualization, Oct. 1993, pp. 204-210.

Ryall, et al., "An Interactive Constraint-Based System for Drawing Graphs" UIST, Oct. 1997, pp. 97-104.

Santini, et al., "Interfaces for Emergent Semantics in Multimedia Databases" PD Jan. 26, 1999, pp. 167-175.

Fruchterman et al., "Graph Drawing by Force-directed Placement" Software Practice & Experience 21(1991) Nov., No. 11, pp. 1129-1164.

Web site: http://vision.stanford.edu/~rubner/demo.html (3 pages).

U.S. Appl. No. 09/491,867, Inventor: Masanobu Funakoshi; filed Jan. 27, 2000.

* cited by examiner

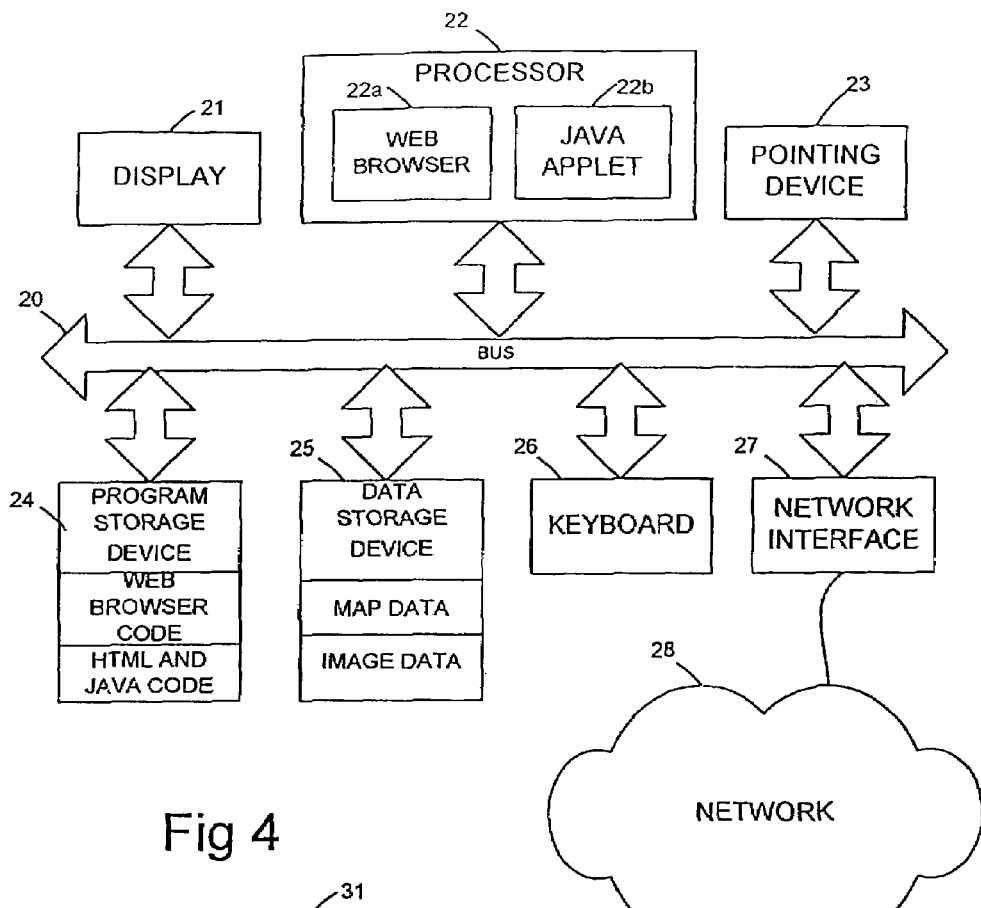
Fig 4
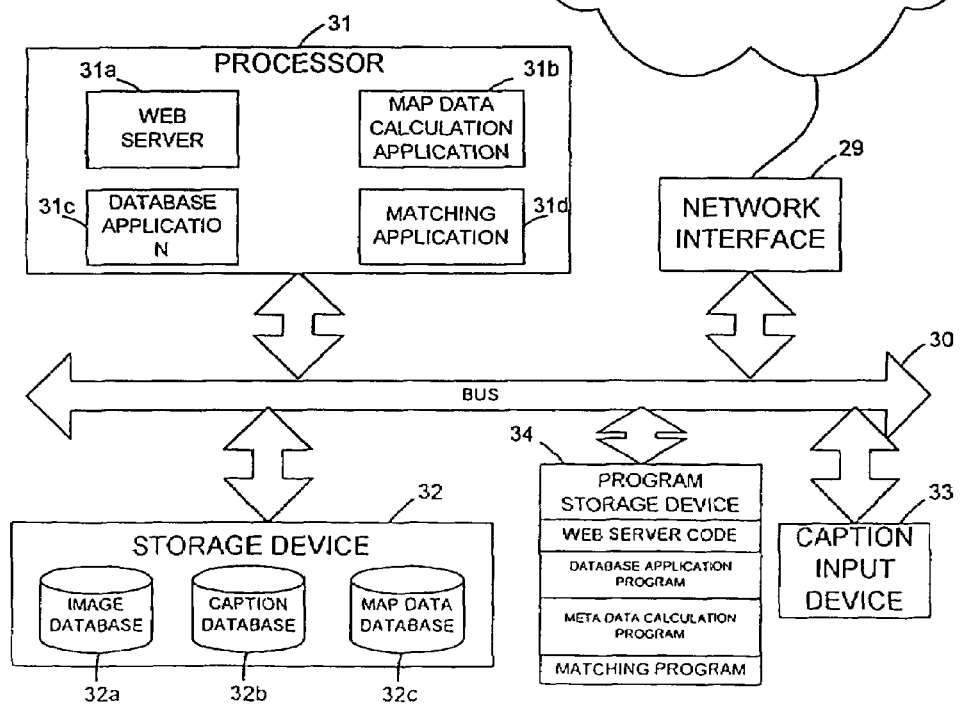

DATA DISPLAY APPARATUS AND DATA DISPLAY METHOD

BACKGROUND OF THE INVENTION

The present invention generally relates to a search engine user interface which allows a user to enter a query and view representations for data which most closely match the query. In particular, the present invention relates to an interface which allows a user to view the data which best matches the query as a two-dimensional arrangement of representations spaced in accordance with the similarity in the data.

FIELD OF THE INVENTION

In computer systems where a large amount of data is stored, there is a problem in providing a simple and accurate method of searching for and retrieving data. Data can be stored in many different formats such as text e.g. documents, audio data e.g. music, image data e.g. pictures, and video data e.g. movies. Also, with the rapid growth in the world-wide web, web search engines have been developed. These form data bases of web pages which are searchable using key words.

For data which contains text, the data can be searched using text queries e.g. key word searches or natural language queries. Such search techniques have been used for many years.

Work has been carried out and published in a paper by R Beale ("Foreign Interactions" Interfaces 37, pages 23 to 26, 1998) with regard to document retrieval. In the system disclosed in the Beale paper a text query results in a three dimensional display likened to a "dandelion head". A central node represents the query and outlying spheres represent documents returned by that query. The size of the node represents the document size and closer the node is to the centre the higher the degree of matching between document and the query. The document can be selected by clicking on a node. If a second query is entered, a second "dandelion head" is generated with any common node being linked. Although this method provides more information than is available by simply listing the documents, it does not show the relationship between the documents returned as a result of the search. Also, navigation of the three-dimensional space is limited.

Another document search technique is disclosed in an article by M Zizi entitled "Interactive Dynamic Maps for Visualisation and Retrieval from Hypertext Systems" (in "Information Retrieval and Hypertext", M. Agosti and A Smeaton (eds), Kluwer Academic, 1996). In this system documents are displayed in positions on a map in a lay-out according to relationships between the documents. A user can then visualise the similarity between documents and select and retrieve the desired document.

For non-text data, it is known that meta data can be provided for the data. Such meta data can include text e.g. a description of the content of the data file to which the meta data is associated. Such meta data is thus searchable using conventional key word searches or natural language searches. Such a technique is disclosed in U.S. Pat. No. 5,493,677.

These techniques for searching non-text data generate search results which usually simply consist of either outputting the best match or a list of matches in order of matching. This does not help a user to understand the relationship between the query and the data returned in the search results, nor does it provide the information regarding the relationships between the data returned.

Another method of searching non-text data is to use non-text queries. For example, audio data can be searched using a particular audio signature. In a paper by Y Rubner et al entitled "Adaptive Colour-Image Embeddings for Database Navigation" (Proceedings 1998 I.E. Asian Conference on Computer Vision, Hong Kong), a system is disclosed which allows for the searching of image data using a colour query. The input colour query is used to determine the closest matches to the query and thumbnail images are then displayed on a two-dimensional map where the images are arranged in dependence upon their colour similarities. A user is able to navigate through the database of colour images by selecting colour images of interest. A plurality of selected colour images are averaged to form the next query and the map is redisplayed centred on the query. Although this method provides a map for a user which is navigable, the information it provides is of very limited use.

It is one object of the present invention to provide a user interface to a search engine of a database which allows the user to obtain a better understanding of the relationship between the query and the returned data and the relationship between the data which has been returned itself.

SUMMARY OF THE INVENTION

This object of the present invention is achieved by a database interface and method, in which the database has a plurality of sets of non-text data. Each set of non-text data has a descriptive text caption associated with it. An input text query is received and compared with the captions to determine the similarities between the input query and the captions. A display means is controlled to display representations of a plurality of sets of non-text data which have captions which are the most similar to the input query and which are separated in accordance with similarities.

This object of the present invention can also be achieved by database interface to a database of a plurality of sets of non-text data where each set of non-text data in the database has a descriptive text caption associated with it. An input textual query is received and compared with the captions for the sets of non-text data to determine the similarities between the input query and the captions. The most similar set of non-text data is then selected and display means is controlled to display a representation of the selected set of non-text data and representations of a plurality of sets of non-text data having the most similar captions to the caption of the selected set of non-text data. The representations are displayed separated in accordance with the similarities.

Thus in accordance with this aspect of the present invention the user is able to identify relationships between sets of data such as images or audio files, based on the arrangement of the representations of the sets of data. The arrangement is based on the textual caption and not the actual content of the sets of data. Thus the textual caption is able to describe the content of the set of data to which it is associated thus facilitating a more user friendly database interface. This is particularly so when natural language is used and in an embodiment the comparison is carried out by comparing the meaning of the captions and the query.

In an embodiment of the present invention the representation for the set of data having the most similar caption to the query is arranged in a central region of the display. The other representations are then arranged around it. This focuses the user on the best match and allows a user to see that the poorer matches lie around the periphery.

The representations of the sets of image data can comprise any form of representation. For instance, for image data, the representation can comprise a thumbnail image. For video data, the representation can comprise a reduced video frame. For other non-text data, the representation can comprise an icon specifically generated to represent the data. Any form of representation can be used which will help the user understand the content of the set of data.

It is an object of another aspect of the present invention to allow a user to select representations and thus navigate through the database with ease.

This object of the present invention is achieved by providing an apparatus for accessing a database of sets of data. Each set of data has similarity data giving the similarity of the data to other sets of data and the identity of the other sets of data. A query is received and compared with the sets of data or meta data for the sets of data to determine at least the most similar set of data. A representation for the most similar set of data is displayed together with representations for the other sets of data arranged in accordance with their similarity. The user is able to select a representation and the similarity data for the set of data corresponding to the selected representation is retrieved. In response to the retrieval of the similarity data, the selected representation and the other sets of data identified in the similarity data are displayed arranged in accordance with their similarities.

Thus this aspect of the present invention, by providing prestored similarity data, avoids the need for the recalculation of similarity values when an image is selected. When an image is selected it becomes effectively a query. Because this is a fixed parameter already known by the data base, the similarity between each set of data and the most similar sets of data can be stored as the similarity data. This avoids the need for a recalculation of similarity values every time a representation is selected as a new query. Thus the system is able to respond more rapidly to the users selection to refresh the display.

When the user makes the initial query, in one embodiment only the most similar set of data is determined. The similarity data for the most similar set of data is then retrieved and the display means is controlled to display a representation of the most similar set of data and representations of the other sets of data identified in the similarity data.

In an alternative embodiment a plurality of the most similar sets of data to the query are determined. The display means is then controlled to display representations of the most similar sets of data arranged in accordance with the similarity values.

Another aspect of the present invention provides a method and apparatus for displaying the relationships between sets of data. Sets of data and similarity values for the similarity between the sets of data are received. Display means is then controlled to display representations for the sets of data separated in accordance with said similarity values. Links are displayed in a first style between the representations which correspond to sets of data having a strong similarity value. Links are displayed in a second style between the representations which correspond to sets of data having a weak similarity.

Thus this aspect of the present invention provides further information to a user. The user is able to identify easily those sets of data which are similar and dissimilar. The links which are shown in the first style tend to act as links which pull the representations together on the display. The links which are displayed in the second style will tend to repel the representations.

In a further aspect of the present invention a data display apparatus and method displays the relationships between sets of data to allow the animated display of the arrangement. Sets of data and similarity values for the similarity between the sets of data is received. The optimum separations of the displayed representations of the sets of data are iteratively calculated from starting separations to target separations corresponding to the similarity values. Display means are then controlled to display the representations arranged in accordance with the iterative calculations at time sequential stages of the iterative calculations. In this way a user is able to see the representations moving from initial positions to optimum positions in order to try to achieve the target separations. Thus a user is able to see which representations tend to move towards and away from one another thus enhancing the visual understanding of the relationship between the sets of data.

BRIEF DESCRIPTION OF THE DRAWINGS

Embodiments of the present invention will now be described with reference to the accompanying drawings, in which:—

FIG. 4 is a schematic diagram of an embodiment of the present invention;

DESCRIPTION OF EMBODIMENTS

Two embodiments of the present invention will now be described. Both of these embodiments comprise an interface for a search engine for searching for images within an image database. Searching is performed using natural language queries which can comprise simple key words or syntactically structured natural language. Each of the images has associated with it meta data in the form of captions which describe the subject matter of the image. Such captions are manually entered during the formation of the database.

First Embodiment

The first embodiment of the present invention will now be described with reference to FIGS. 1 to 9.

Figure 1:
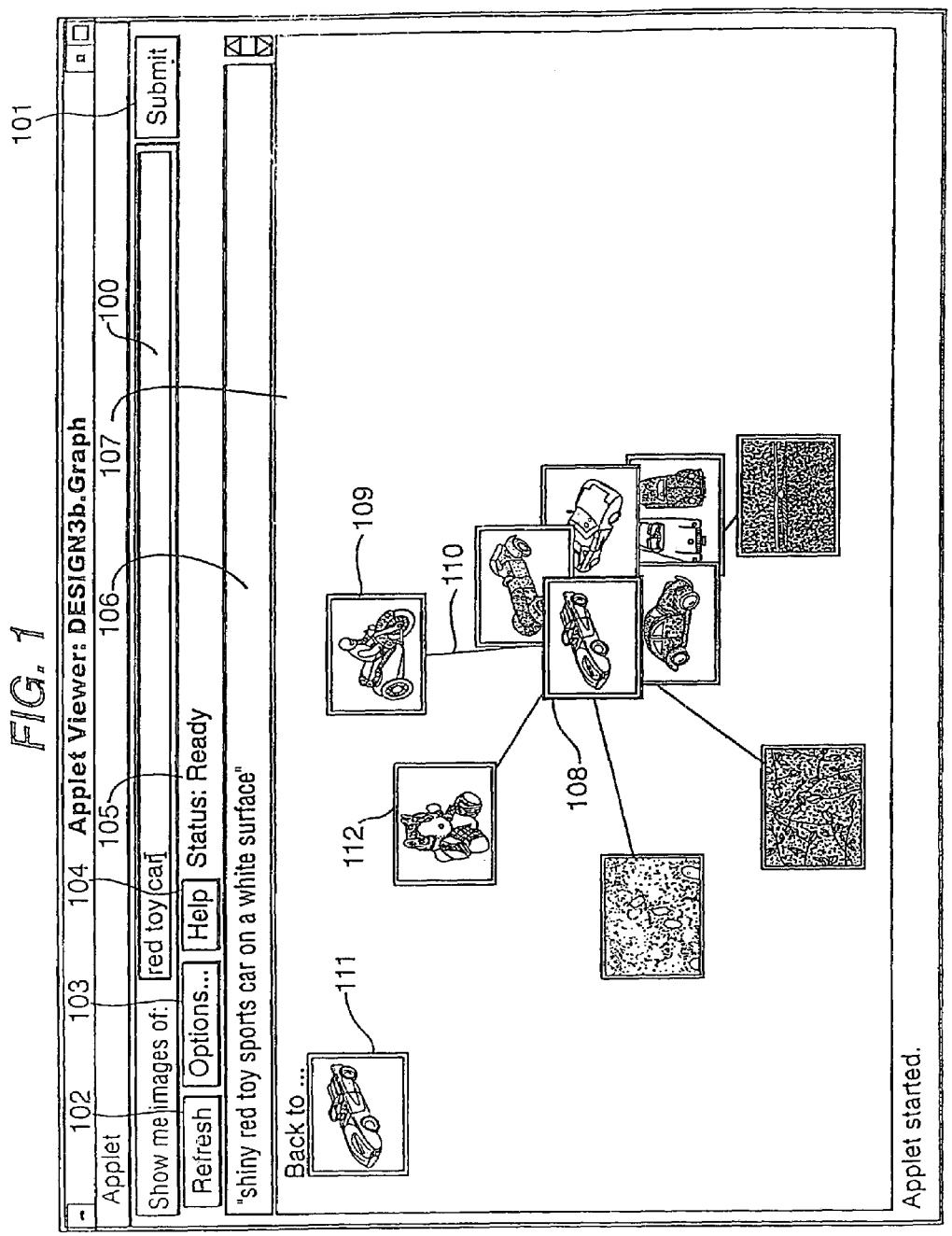
FIG. 1 is a diagram of the interface displayed to a user of an embodiment of the present invention following the input of a query "red toy car"

Referring to FIG. 1, this diagram illustrates the interface to a user. A user operates a computer with a web browser such as Microsoft Explorer™. Within the web browser, a particular HTML file is opened which invokes a Java applet. The Java applet configures the display to include a query input window 100 with a submit button 101. This enables a user to type in a query and by clicking on the submit button 101 the query can be sent to a search engine as a search query. The query window 100 is of course initially empty and in FIG. 1 the query "red toy car" has been entered. Below the query window 100 three buttons are provided. A refresh button 102 is provided for causing the re-rendering of the map data as will be described in more detail hereinafter. An options button 103 is provided to allow for the configuration of various parameters as will be described in more detail hereinafter. Also, as is conventional, a help button 104 is provided to allow a user to access information to help them use the interface. These buttons can be selected as is conventional within a web browser by moving a pointer using for example a mouse and clicking. Next to the buttons there is provided status information in a status display region 105. The status information that can be provided comprises:

1. "Ready" indicating that the interface is awaiting an input from the user.
2. "Downloading map data" indicating that the interface is clearing data for forming the map".
3. "Organising images" indicating that the interface is rendering the map.
4. "Sending query" indicating that the interface is sending a query to search engine.

Underneath the buttons. 102, 103, 104 and the status information display region 105 there is provided a region 106 in which is displayed a caption for an image in the image data base to be searched. Initially this is empty but once a map has been formed, it contains the caption of the best match to the query hereinafter termed a "focal image".

Below the caption section 106 of the display, there is provided a map window 107 which comprises the bulk of the display. It is within this window that the search results from the search engine are mapped. Initially of course, the map window 107 is empty. As can be seen in FIG. 1, once a query has been entered map data in the form of thumbnail images is formed. It can be seen in FIG. 1 that as a result of the query "red toy car" an image 108 is highlighted the centre of the map window 107. This is a thumbnail image of the image data which most closely matches the input query. The closest match therefore becomes the focus of the map and the next closest matching images are used to form thumbnail images about the focal image 108. The proximity of the thumbnail images to the focal image depends on the similarity between the thumbnail images and the focal image. It can clearly be seen in FIG. 1 that cars are clustered around the focal image 108. The images are allowed to overlap. Between the images links can be shown. For example, between the focal image 108 and the image 109 a link 110 is illustrated. This helps to illustrate the relationship between the images. Links can also be shown between the images surrounding the focal image 108.

The arrangement of the thumbnail images within the map window 107 is dependent upon the similarity between them based on their captions. The similarity measure in this embodiment is determined off line and is contained within a database. The input can be matched to the captions in the database to determine the best match. Once the best match is found, predetermined similarities between the best match and other entries in the database are used. This will be described in more detail hereinafter.

Also within the map window 107 there is provided a thumbnail image 111 which acts as a "back button" to allow the user to return to a previous map following a navigation around the map as will be described next.

Figure 2:
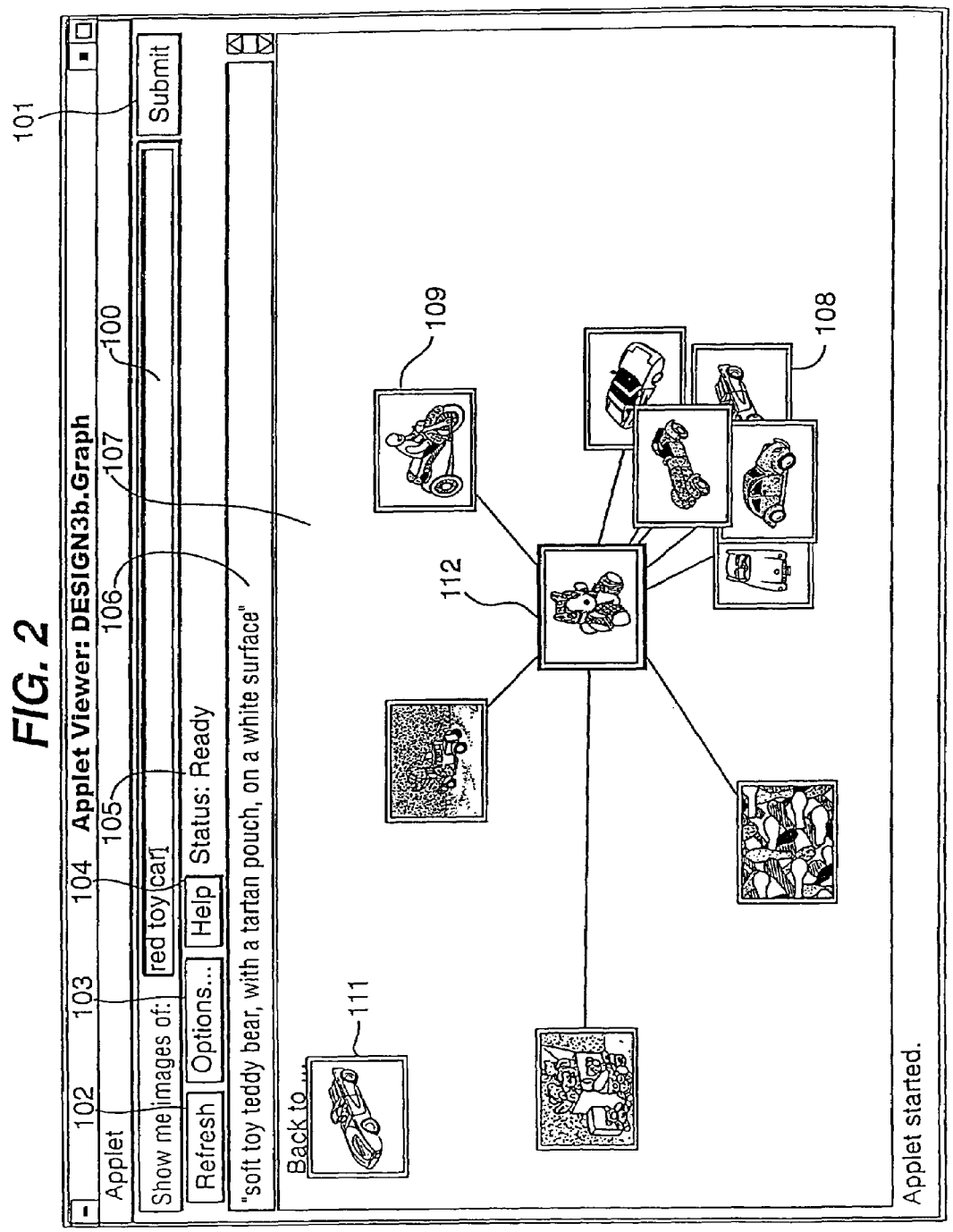
FIG. 2 is a diagram of the interface displayed to a user following the selection of an image of FIG. 1 as a query.

A user is able to navigate around the image database by selecting a thumbnail image using a pointer and clicking on the thumbnail. When a user selects the thumbnail image 112 in FIG. 1, the selected thumbnail image becomes the focal image and the most similar images to the focal image are then displayed around the new focal image. As can be seen in FIG. 2, the five thumbnail images of cars which includes the original focal image 108 remain as does image 109. The remaining images are new. Once again the focal image 112 is displayed highlighted. Also, the caption window 106 now displays the caption for the new focal image.

The functionality of this embodiment of the present invention will now be described with reference to FIG. 3 which illustrates the functional components of this embodiment.

A user interface 1 is provided which comprises a pointing device 2 such as a mouse, an input device 4 such as a keyboard and a display device 3. When a user inputs a query using the query input device 4, this is sent to the on-line similarity calculator 9. This will access meta data in the meta data database 6 via the storage device control 5 in order to identify the best match between the query and the meta data entries for the data. Once a best match has been found, an image is identified using corresponding map data stored in the map data database 7 and corresponding data from the database 8 is retrieved and passed to the rendering processor 10 for rendering to form the map in the map window 107 on the display device 3.

In order to form the map data in the database 7, an off line process has to take place prior to the use of the system. An off line similarity calculator 11 accesses the meta data in the database 6 in order to determine the similarities between the meta data entries. These similarity values are then used to form map data using the map data calculator 12. The calculated map data is then stored in the map data database 7.

FIG. 4 is a schematic diagram of an implementation of the present invention. This embodiment comprises a server and client linked over a network 28. Because in this embodiment a web browser is used, the network can comprise any form of network such as a local area network or the Internet. The client comprises a bus 20 linking the components of the client system together. A display 21 is provided for providing a display output of the form as shown in FIGS. 1 and 2. A processor 22 implements code stored in a program storage device 24. Web browser code within the program storage device 24 enables the processor 32 to implement a web browser 32*a*. HTML and Java code is stored in the program storage device 24 and enables the web browser 22*a* to launch a Java applet 22*b*. A pointing device 23 such as a mouse is provided to allow a user to select displayed items. A keyboard 26 is provided to allow the user to enter a query. Data storage 25 contains map data and image data to enable the map in the map window 107 of the display to be rendered. An interface 27 is provided for interfacing to the network 28 to enable the client to access the server.

The server is provided with a bus 30 linking components together. A network interface 29 is provided to link the server to the network 28. A processor 37 is provided to implement programs stored in the program storage device 34. Web server code stored in the program storage device 34 is loaded by the processor 31 in order to implement a web server 31*a*. A database application program is loaded by the processor 31 in order to implement a database application 31*c*. A map data calculation program stored in the program storage device 34 is loaded by the processor 31 in order to implement a map data calculation application 31*b*. A matching program is loaded by the processor 31 in order to implement a matching application 31*b*.

The server is also provided with a storage device 32 comprising an image database 32*a*, a caption database 32*b* and a map data database 32*c*. These databases store respective image captions and map data. In order to generate the caption database 32*b*, a server is also provided with an caption input device 33 which can for example comprise a keyboard to allow an operator to manually enter the captions for the images.

As can be seen from FIG. 4, this embodiment of the present invention can be implemented over the network wherein the client operates a single Java application. The bulk of the processing is carried out at the server.

The operation of this embodiment of the present invention will now be described in detail with reference to the flow diagram of FIGS. 5 to 9.

Figure 5:
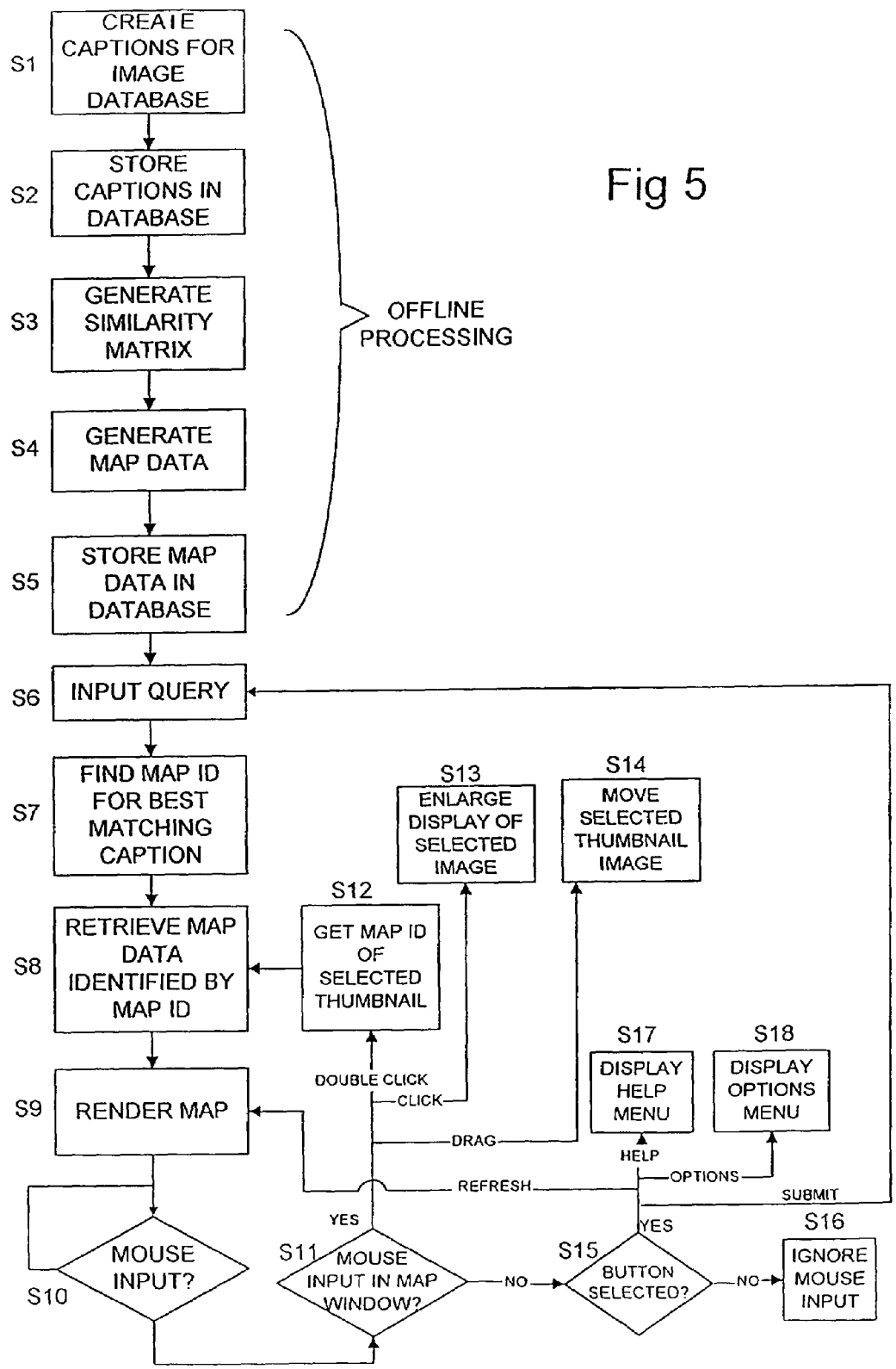
FIG. 5 is a flow diagram showing the overall process of an embodiment of the present invention.

FIG. 5 is a flow diagram illustrating the overall operation of this embodiment of the present invention. In step S1 an operator creates captions for the image data base. The captions are then stored in the captions database in step S2. A caption can comprise a description of the subject matter of the images to enable natural language queries to be used for searching the image database.

In step S3 the similarity between the captions (and thus the images) is determined in order to generate similarity matrices. A similarity matrix is generated for each image and comprises similarity values for only a number of closest or best match images. Thus, similarities need not be kept for similarities between all images. The details of the generation of the similarity matrices will be described hereinafter with reference to FIG. 6.

Using the similarity matrices map data is generated for each image in the image database in step S4. This is then stored in the map data database in step S5. Details of the generation of the map data will be described hereinafter in more detail with reference to FIG. 7.

Steps S1 to S5 comprise processing steps which take place before a user enters a query. In other words the image database, caption database, and map data databases are formed off-line ready for a user to enter queries.

The on-line process following the input of a query by a user will now be described.

In step S6 a user inputs a query such as illustrated in FIG. 1 by typing in for example "red toy car". This is submitted by using the submit button 101. Using the on-line similarity calculator 9 the best match between the input query and the captions is determined in order to identify the corresponding map ID in step S7. Using the determined map ID, in step S8 map data is retrieved from the map data database. In step S9 the map is rendered using the map data and by retrieving image data referenced in the map data. In step S10 the process will then await a mouse input. When a mouse input is received in step S11 it is determined whether this input has occurred within the map window. If there was a map input within the map window, there are three possible inputs: double click, click and drag. If a double click event occurs, in step S12 the map ID of the selected thumbnail is obtained and the process returns to step S8 whereby the map ID is used to retrieve the map data. This process is illustrated in the transition from the displays of FIGS. 1 and 2. In the display of FIG. 1 the user has selected the image 112 by double clicking which results in the display of FIG. 2 wherein the image 112 becomes the focal image.

If the mouse event in the map window is a click event, in step S13 the selected image is displayed at an enlarged size to enable a user to more easily view it. In order to avoid cluttering the map window 107, only one image can be selected to be displayed enlarged at a time. If another image is selected whilst an image is displayed enlarged, the previously selected image is returned to its thumbnail size and the newly selected image is displayed at an enlarged size.

If the mouse input in the map window comprises a drag event, a thumbnail image which had been selected to be dragged is moved within the map window. Any links between the thumbnail images are maintained and move as necessary during the movement of the selected image in step S14. This ability to allow a user to move images enables a user to manually rearrange the thumbnail images either to allow the rendering process to be repeated using the refresh button 102, or merely to pull out an image which is partially covered by other images so that it can viewed. For instance, a user may wish to move the thumbnail image 108 illustrated in FIG. 2 which is partly obscured in order to be able to see the full thumbnail image. This may be the image that the user is seeking in the search.

In step S11 if the mouse input is not in the map window, in step S15 it is determined whether the mouse input comprises the selection of a button. If not, in step S16 the mouse input is ignored. If a button is selected, if the refresh button is selected the process then returns to step S9 to re-render the map. The re-rendering process may be desirable for several reasons. As will be described hereinafter, the rendering process includes the calculation of the separation of the images for a limited period of time. In other words, the algorithm which determines the spacing of the images iterates towards the solution but is only allowed a certain time to do it. A user may wish to allow the iterations to continue for a longer and thus the refresh button 102 can be selected for this purpose. Also, if a user has manually moved a thumbnail using the process of step S14, this may help in clarifying the rendering process. Because the arrangement of the thumbnail images from the map window 107 is determined by an algorithm which has to take into consideration competing forces between images, the map displayed may not be the only "solution". Thus because it is possible to move a selected thumbnail and re-render, a more clear map may result.

If the button selected in step S15 is determined to be the help button, in step S17 the help menu is displayed. The help menu includes information to help a user to use the software.

If in step S15 it is determined that the options button has been selected, in step S18 the options menu is displayed. The options menu allows various configurations of options of the system to be set. The linkage strategy can be set so that either:

1. Radial links are set i.e. the links from the focal image to each of the other images,
2. All of the links are shown, or
3. None of the links are shown.

Using the options menu the number of thumbnail images rendered in the map can also be selected. As mentioned hereinabove, the similarity matrices do not contain similarity values for all images. In the present embodiment the number of thumbnails N is set to 10. Thus, each matrix is a 10 by 10 matrix wherein for an image similarity values for the 9 best matches are included. The options menu allows the number of thumbnails to be reduced to a number less than N. This means that images with the lowest similarity value to the focal image will not be displayed. It is not possible to show a number of thumbnail images greater than the number in the similarity matrices because the similarity values are not available.

Another options setting which is available is to allow the web browser to preload images. Thus when this is selected, instead of the map being formed wherein the images are gradually displayed as image data is retrieved, no map data is illustrated until all the images are available. This causes a delay but ensures that all the images are available for the rendering process before the rendering process begins.

In step S15 of FIG. 5 if the button selected is the submit button, this means that a new query has been input and thus the process returns to step S6.

As can be seen from FIG. 5, the embodiment of the present invention allows a user to manually input a natural language query, or effectively enter a query by a selecting an image. A method of entry of a query by selection of an image enables a user to navigate the image database. If during navigation the original image is not included in the closest matches surrounding the new focal image, a user is able to return to the previous map data using the back button 111 which is the image of the previous focal image.

In this embodiment the generation of the similarity matrices takes place off line by determining the similarity between the entries in the database. This has the benefit of reducing the processing time required. It is only necessary simply to identify the best match between the input query and the captions in the captions database. However, this suffers from the disadvantage that the best matches illustrated in the map are the best matches to the focal image and not the best matches to the query. A benefit of this however is that the user is given an impression of the pattern of data in the database.

Figure 6:
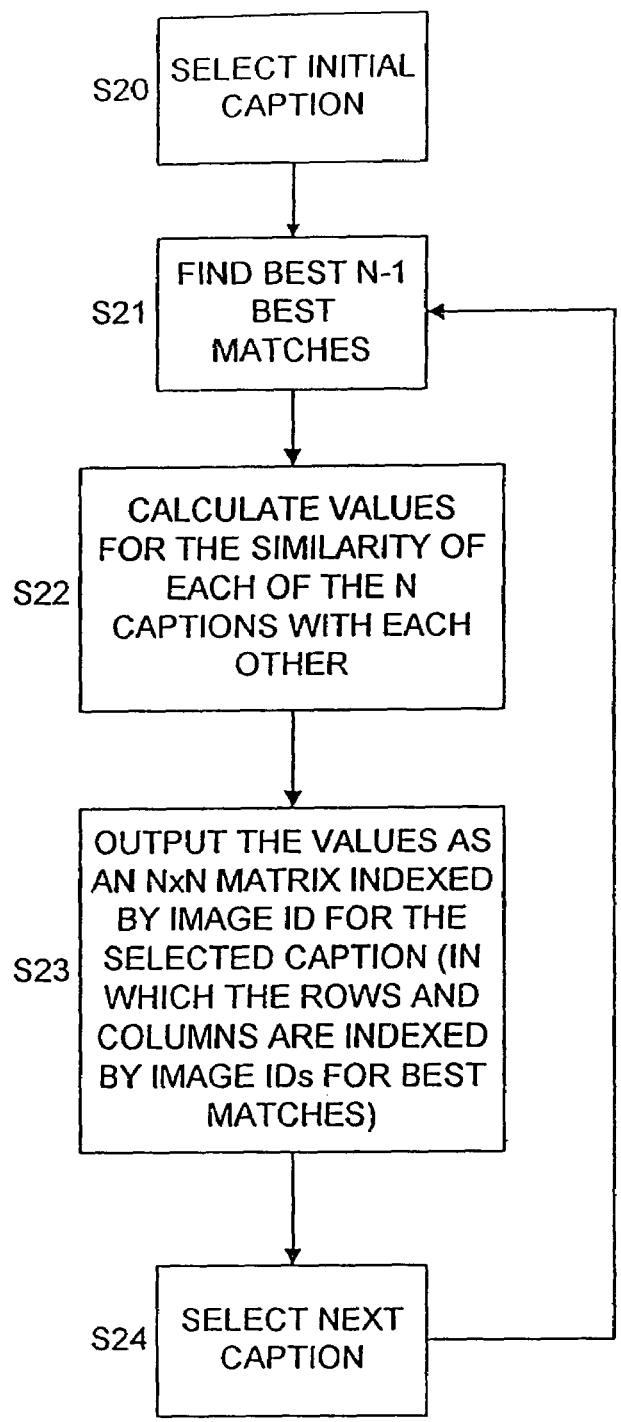
FIG. 6 is a flow diagram illustrating the method of calculating the similarity matrices off line.

The method of generating the similarity matrices (step S3 in FIG. 5) will now be described with reference to FIG. 6.

In step S20 an initial caption is selected from the caption database. In step S21 the best N−1 best matches are found. The matching process in this embodiment can comprise a simple keyword matching but preferably comprise a full natural language phrase matching technique as disclosed in UK Patent Application No. 9904662 and UK Patent Application No. 9821969 the contents of which are hereby incorporated by reference. The best matches are found by comparing similarity values returned from the matching process. Thus the result of step S21 is a series of values which will be used to form the radial links in the map data.

The process then goes on in step S22 to calculate the values for the similarity of each of the other captions with each other. The purpose of this is generate a full N×N matrix so that not only can radial links be determined in the rendering of the map, but also links between outlying images. In step S23 the values are output of an N×N matrix indexed by the image ID for the selected caption. In the matrix the rows and columns are indexed by image IDs' for the best matches. In step S24 the next caption is selected and the process returns to step S21. The process in FIG. 6 thus repeats for each of the captions in the caption database to form the similarity matrices.

Table 1 below illustrates the similarity matrix for the focal image of FIG. 1.

TABLE 1

|  | 17/71 | 17/72 | 17/73 | 5/62 | 6/35 | 6/36 | 6/37 | 6/38 | 6/39 | 6/40 |
|---|---|---|---|---|---|---|---|---|---|---|
| 17/71 | 1.00 | 0.51 | 0.67 | 0.00 | 0.67 | 0.36 | 0.42 | 0.34 | 0.65 | 0.40 |
| 17/72 | 0.51 | 1.00 | 0.49 | 0.00 | 0.64 | 0.36 | 0.38 | 0.32 | 0.62 | 0.38 |
| 17/73 | 0.67 | 0.49 | 1.00 | 0.00 | 0.55 | 0.31 | 0.33 | 0.27 | 0.53 | 0.32 |
| 5/62 | 0.00 | 0.00 | 0.00 | 1.00 | 0.02 | 0.28 | 0.03 | 0.03 | 0.00 | 0.09 |
| 6/35 | 0.67 | 0.64 | 0.55 | 0.02 | 1.00 | 0.59 | 0.63 | 0.52 | 0.93 | 0.61 |
| 6/36 | 0.36 | 0.36 | 0.31 | 0.28 | 0.59 | 1.00 | 0.36 | 0.64 | 0.53 | 0.38 |
| 6/37 | 0.42 | 0.38 | 0.33 | 0.03 | 0.63 | 0.36 | 1.00 | 0.34 | 0.56 | 0.40 |
| 6/38 | 0.34 | 0.32 | 0.27 | 0.03 | 0.52 | 0.64 | 0.34 | 1.00 | 0.47 | 0.36 |
| 6/39 | 0.65 | 0.62 | 0.53 | 0.00 | 0.93 | 0.53 | 0.56 | 0.47 | 1.00 | 0.56 |
| 6/43 | 0.40 | 0.38 | 0.32 | 0.09 | 0.61 | 0.38 | 0.40 | 0.36 | 0.56 | 1.00 |

Table 2 below illustrates the similarity matrix for the focal image of FIG. 2.

TABLE 2

|  | 16/70 | 17/69 | 17/70 | 17/71 | 17/72 | 17/74 | 6/35 | 6/39 | 6/43 | 6/44 |
|---|---|---|---|---|---|---|---|---|---|---|
| 16/70 | 1.00 | 0.00 | 0.09 | 0.00 | 0.00 | 0.24 | 0.00 | 0.00 | 0.22 | 0.41 |
| 17/69 | 0.00 | 1.00 | 0.19 | 0.03 | 0.00 | 0.29 | 0.00 | 0.00 | 0.26 | 0.37 |
| 17/70 | 0.09 | 0.19 | 1.00 | 0.23 | 0.27 | 0.12 | 0.26 | 0.25 | 0.27 | 0.08 |
| 17/71 | 0.00 | 0.03 | 0.23 | 1.00 | 0.51 | 0.36 | 0.67 | 0.65 | 0.20 | 0.00 |
| 17/72 | 0.00 | 0.00 | 0.27 | 0.51 | 1.00 | 0.33 | 0.64 | 0.62 | 0.20 | 0.00 |
| 17/74 | 0.24 | 0.29 | 0.12 | 0.36 | 0.33 | 1.00 | 0.27 | 0.26 | 0.42 | 0.46 |
| 6/35 | 0.00 | 0.00 | 0.26 | 0.67 | 0.64 | 0.27 | 1.00 | 0.93 | 0.25 | 0.05 |
| 6/39 | 0.00 | 0.00 | 0.25 | 0.65 | 0.62 | 0.26 | 0.93 | 1.00 | 0.22 | 0.00 |
| 6/43 | 0.22 | 0.26 | 0.27 | 0.20 | 0.20 | 0.42 | 0.25 | 0.22 | 1.00 | 0.46 |
| 6/44 | 0.41 | 0.37 | 0.08 | 0.00 | 0.00 | 0.46 | 0.05 | 0.00 | 0.46 | 1.00 |

In the similarity matrices given in the tables above, the images are identified by an image ID of the format "directory/image number". Thus the first column in Table 1 is for similarity values for the 10 images similar to image number 71 in directory 17.

It can be seen that the diagonal window of the matrix has values of 1. Below the diagonal line the values will repeat what appears above. Thus only the upper or lower part of the matrix need be stored for the present technique wherein the similarity measure between images is symmetric i.e. it does not matter which image you take as the reference in the comparison e.g. comparing image 17/71 with image 17/72 is equivalent to comparing image 17/72 with image 17/71.

Figure 7:
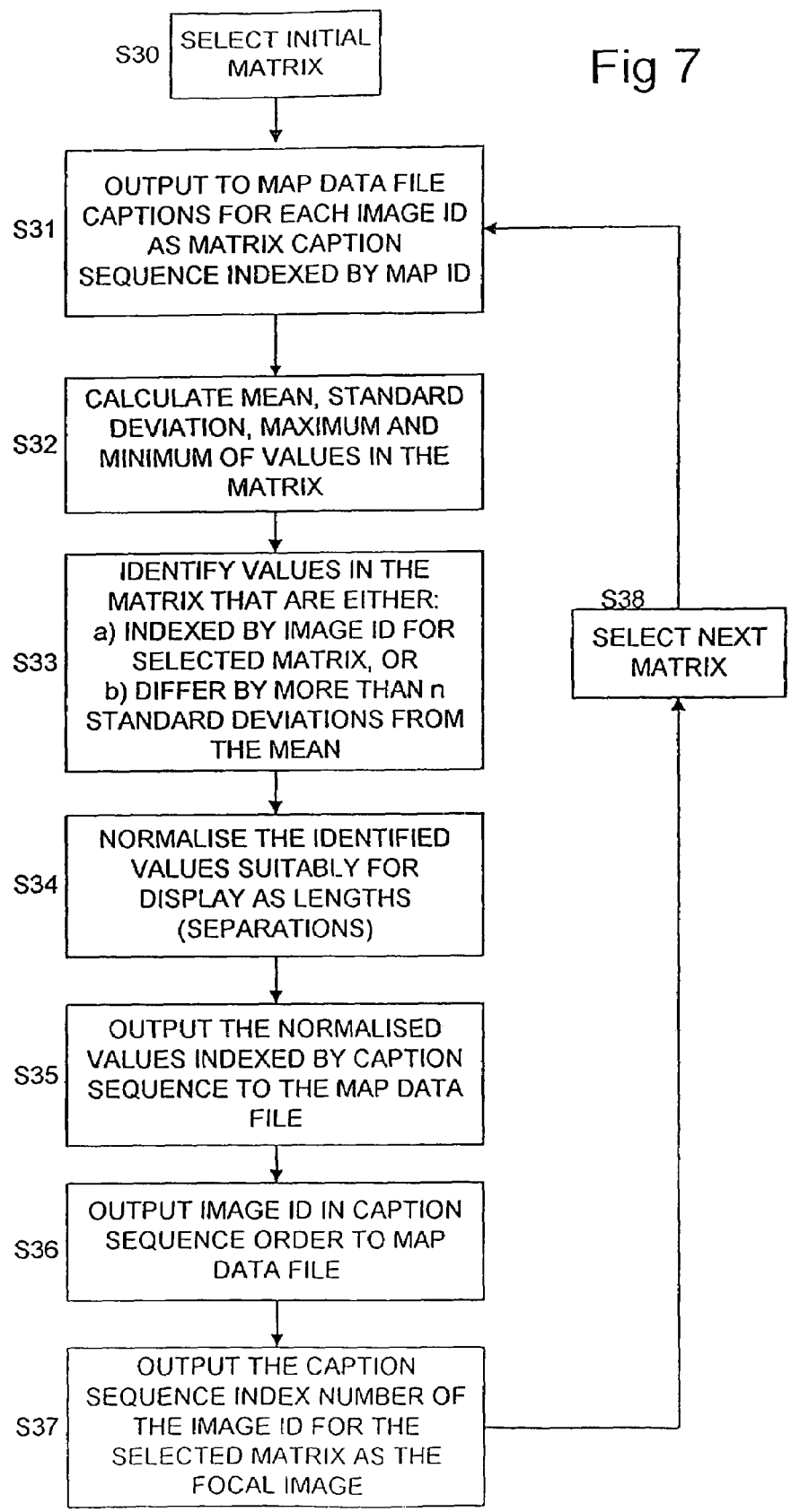
FIG. 7 is a flow diagram illustrating the method of calculating map data for the similarity matrixes off line.

The process of calculating the map data from each of the similarity matrices will now be described with reference to FIG. 7.

In step S30 an initial matrix is selected. In step S31 captions for each image ID used to index the matrix is output to a map data file indexed by the map ID. The mean, standard deviation, maximum and minimum values in the matrix are then calculated in step S32. In order to reduce the number of links which are used in the map data, only links which are significant are kept. Significant links are determined in step S33 by identifying values in the matrix that are either indexed by image ID for the selected matrix, or values which differ by more than n standard deviations from the mean, where n=1.25 in this embodiment. Thus all of the radial links are identified together with links which indicate a strong similarity or a strong dissimilarity. In step S34 the identified values are then normalised to values which are suitable for displaying as links i.e. separations between the images. The normalised values are then output to the map data file and indexed by the caption sequence i.e. if a link value is output for a link between the first and fourth image in the sequence, the output format is "1–4/length", where "length" is the link length.

In step S36 the image ID for each of the images in the caption sequence is then output to the map data file. Then in step S37 the caption sequence index number of the image ID for the selected matrix is output as an indication of the focal image in order to complete the data in the map data file. In step S38 the next matrix is then selected and the process returns to step S31.

The map data file for the image 6/36 i.e. the focal image of FIG. 1 is indicated below:
red watermelon flesh with black seeds sunk into the surface. | red rose stems in bud on a jet-black surface.| sunrise, producing a bright white light and an orange glow over planet Earth's surface, as seen from outer space. | one red toy car and one blue toy car on a white surface. | shiny red toy sports car on a white surface. | dark blue Beetle-shaped toy car on a white surface. | yellow toy Ferrari sports car on a white surface. | colourful clown toy car on a white surface. | metal toy motorcycle and sidecar on a white surface. | soft toy teddy bear, with tartan pouch, on a white surface.
4-0/192 4-1/192 4-2/175 4-3/85 5-3/50 5-4/50 6-4/75 7-3/75 7-4/75 7-5/75 7-6/75 8-4/153 9-4/153
17/img0071.jpg 17/img0072.jpg 17/img0073.jpg
5/img0062.jpg 6/img0035.jpg 6/img0036.jpg
6/img0037.jpg 6/img0038.jpg 6/img0039.jpg
6/img0043.jpg
5

The map data file for the image 6/43 i.e. the focal image of FIG. 2 is given below:
brightly coloured party balloons on a white surface. | one red toy car and one blue toy car on a white surface. | shiny red toy sports car on a white surface. | dark blue Beetle-shaped toy car on a white surface. | yellow toy Ferrari sports car on a white surface. | colourful clown toy car on a white surface. | metal toy motorcycle and sidecar on a white surface. | soft toy teddy bear, with tartan pouch, on a white surface. | soft toys sitting by and peeping from a wooden toy-box. | teddy bear riding an old, red tin toy truck.
2-1/85 3-1/50 3-2/80 4-2/75 5-1/75 5-2/75 5-3/75 5-4/75 7-0/212 7-1/153 7-2/153 7-3/153 7-4/153 7-5/153 7-6/153 8-7/300 9-7/151
16/img0070.jpg 17/img0069.jpg 17/img0070.jpg
17/img0071.jpg 17/img0072.jpg 17/img0074.jpg
6/img0035.jpg 6/img0039.jpg 6/img0043.jpg
6/img0044.jpg
8

As can be seen above, the captions and the image IDs' are output as a sequence, the link length data is output as lengths indexed in accordance with the sequence. The final piece of data from the map data file is the indication of the focal image by the use of the index to refer to the image ID in the sequence. Thus in the data file for image 6/36 the final data entry 5 indicates that the fifth position in the sequence identifies the focal image.

It is not essential to use this final piece of data to indicate the focal image. Instead the sequence could be ordered such that the focal image is always the first in the sequence.

Although the generation of the similarity matrices and the map data files have been described as two separate processes wherein once the matrices have been formed, the map data files are formed, in practice, in order to reduce storage, the map data file calculation is carried out immediately following the generation of the similarity matrix for a selected caption. Thus the similarity matrices are not stored and are transient: they are merely used as an intermediary to form the map data files.

The resulting map data files are stored in the map data database for use in the rendering of the map in the map window 107. Map data files contain all of the information necessary for the rendering process. The rendering process merely needs to retrieve the image data identified in the map data file.

The rendering process for the formation of the map data in the map window 107 will now be described in detail with reference to FIGS. 8 and 9.

In step S40 the map data is input having a map ID for the best matching caption or having the map ID of the selected thumbnail. The thumbnail of the focal image is retrieved and rendered at the centre of the map window in step S41. In step S42 the thumbnails of the other images indexed in the map data file are rendered at predetermined positions around the focal image. These predetermined positions can be at equally spaced positions around the focal image or at random positions. The starting positions are not particularly important.

In step S43 a counter i is set to zero and in step S44 the counter is incremented. In step S45 new thumbnail positions are calculated and the thumbnails are rendered in the new positions. Following this in step S46 the average thumbnail position (termed curr.ave) is determined. In step S47 it is then determined whether the counter i has reached 10. If not, the process returns to step S44.

Thus steps S44 to S47 are repeated ten times. In other words, the new thumbnail positions are calculated and the thumbnails are rendered at those positions ten times and each time the average thumbnail position is determined.

In step S48 a ten point moving average of the average thumbnail position (termed mov.ave) is determined.

In step S49 it is determined whether the current average position is within a range of the ten point moving average and if the time taken is greater than 5 seconds. If so the rendering process has completed and the process stops in step S50. If not in step S51 it is determined whether the time T is greater than 15 seconds. If so the process terminates in step S50 and if not the process returns to step S43. Thus, in step S49 it is determined whether there is still significant movement of the images or whether they have converged towards a solution. The process is allowed at least 5 seconds to iterate but no more than 15 seconds.

Figure 8:
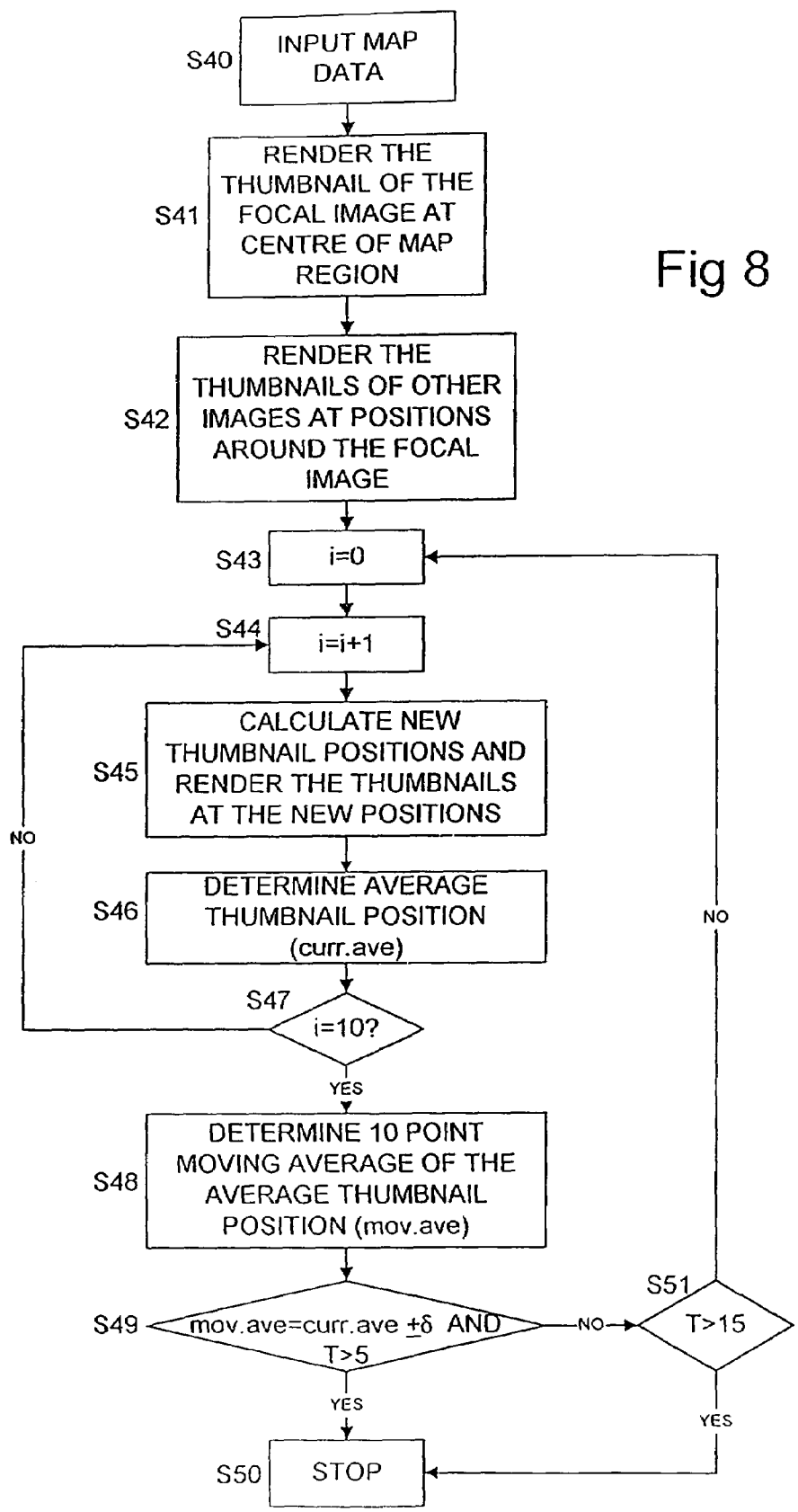
FIG. 8 is a flow diagram illustrating the method of rendering the map.
Figure 9:
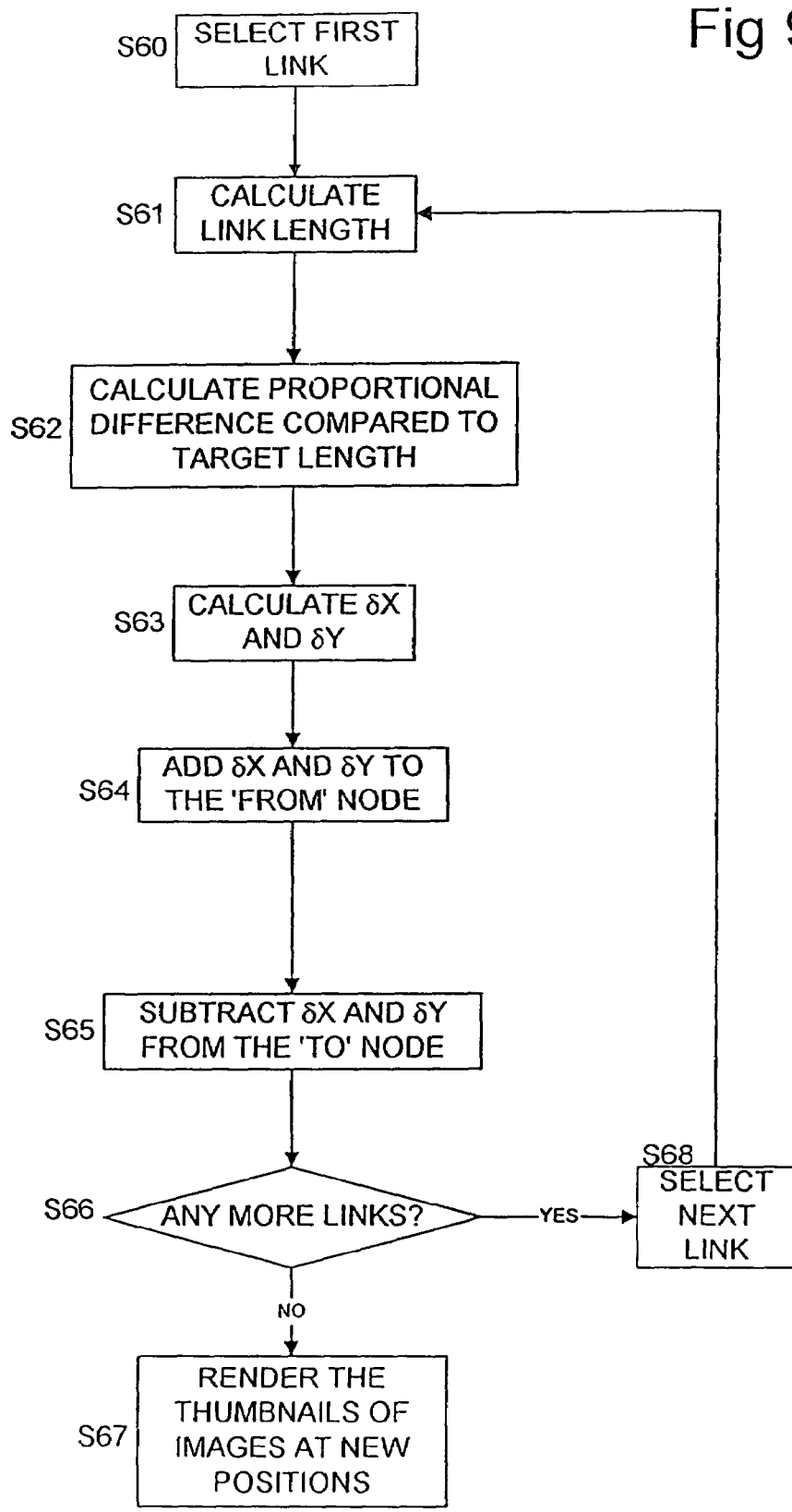
FIG. 9 is a flow diagram illustrating in more detail the steps carried out in step S45 of the flow diagram of FIG. 8.

FIG. 9 illustrates in more detail the process of calculating the new thumbnail positions i.e. step S45 of FIG. 8.

In step S60 a first link is selected i.e. the separation of two images corresponding to two images which have a separation value in the map data file. The link length is calculated by measuring the x and y distances between the nodes (images). This is the actual length of the link (ACTUAL_LEN). The equation used is:

$$ACTUAL\_LEN = \sqrt{(XDIST)^2 + (YDIST)^2}$$

where XDIST is the distance between the nodes along the X axis and YDIST is the distance between the nodes along the Y axis.

In step S62 the proportional difference between the actual length and the target length, i.e. the length in the map data file is then calculated using:

$$PDIFF = \frac{ACTUAL\_LEN - TARGET\_LEN}{ACTUAL\_LEN}$$

where PDIFF is the proportional difference
ACTUAL_LEN is the actual length calculated and
TARGET_LEN is the target length.

In step S63 δX and δY are calculated from:

$\delta X = XDIST \times PDIFF$ $\delta Y = XDIST \times PDIFF$

In step S64 δX and δY are added to the "from" node i.e. the node identified by the first index in the map data files and in step S65 δX and δY are subtracted from the "to" node. For example, in the map data file for image 6/36 i.e. the map data file for FIG. 1, the first link is given in the format 4-0/192. This identifies the link as being from the fourth image in the sequence to the zero image in the sequence and the link length is 192. (In the map data file, the 10 images are indexed from 0 to 9). Thus step S64 requires the addition of δX and δY to the position of the fourth image in the caption sequence i.e. 6/35 and the substraction of δX and δY from the zero image in the sequence i.e. image 17/71. This causes the nodes to then move towards the required length. Because the value of δX and δY can be negative, although step S64 is addition and step S65 is substraction, this does not result in the nodes moving closer together but can result in the nodes moving further apart.

In step S66 it is then determined whether there are any more links to be processed and if so, in step S68 the next link is selected and the process returns to step S61. If all the links have been processed, in step S67 the thumbnails are rendered at their new positions. Thus the process of FIG. 9 comprises a single iteration in the rendering process.

This embodiment of the present invention thus provides a simple method allowing a user to enter a query and to be presented with a map of thumbnail images in which the focal image comprises the best match to the query. The surrounding images comprise images which are the best matches in the database to the focal image. This enables a user to navigate through the database by selecting an image as a new focal image. Such a technique is fast because there is no need to perform on-line matching. There is no query input and instead, the ID of the select image is used to retrieve the map data for the generation of the next map.

Second Embodiment

Figure 11:
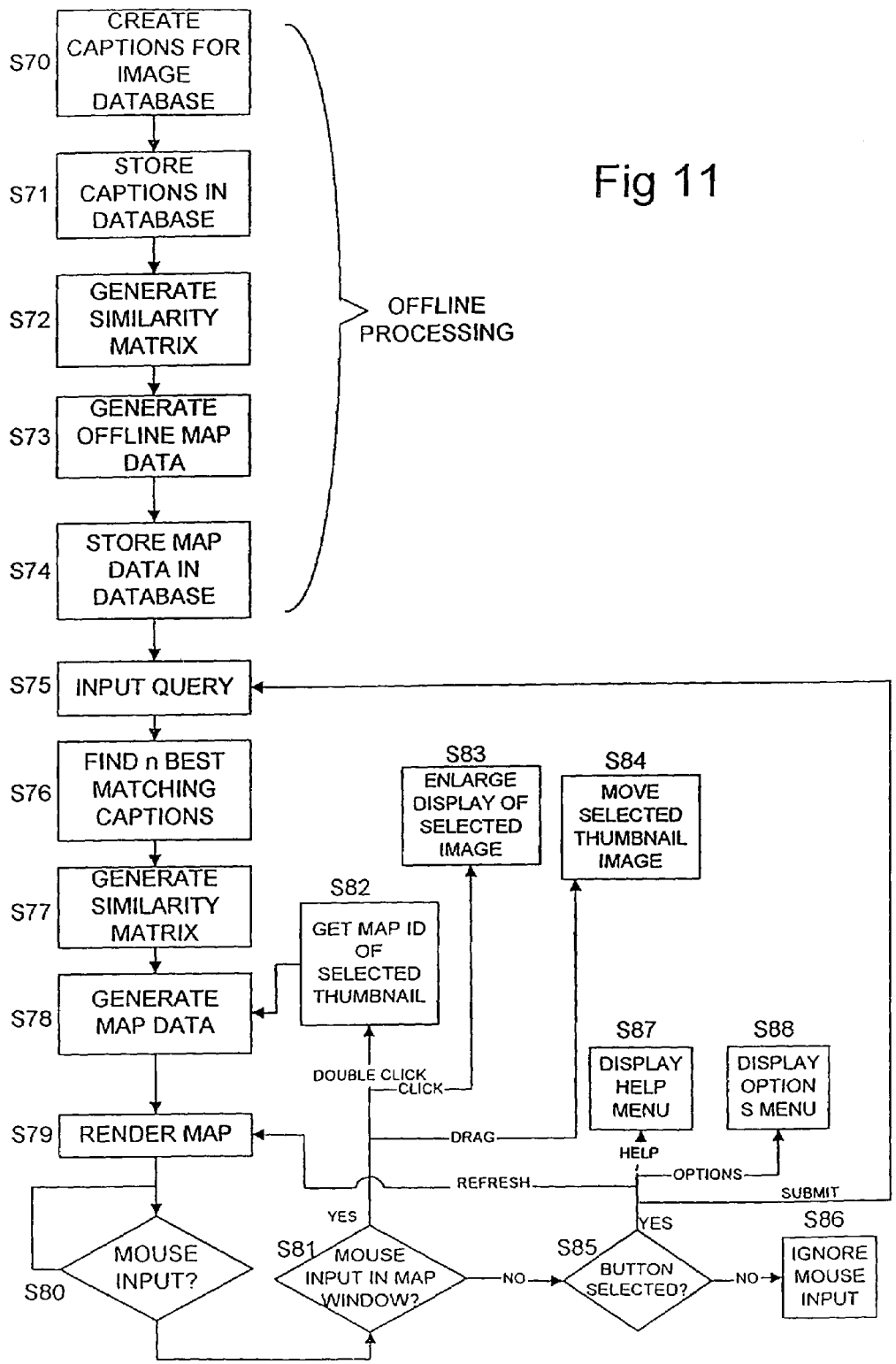
FIG. 11 is a flow diagram of the overall operation of the second embodiment of the present invention.
Figure 12:
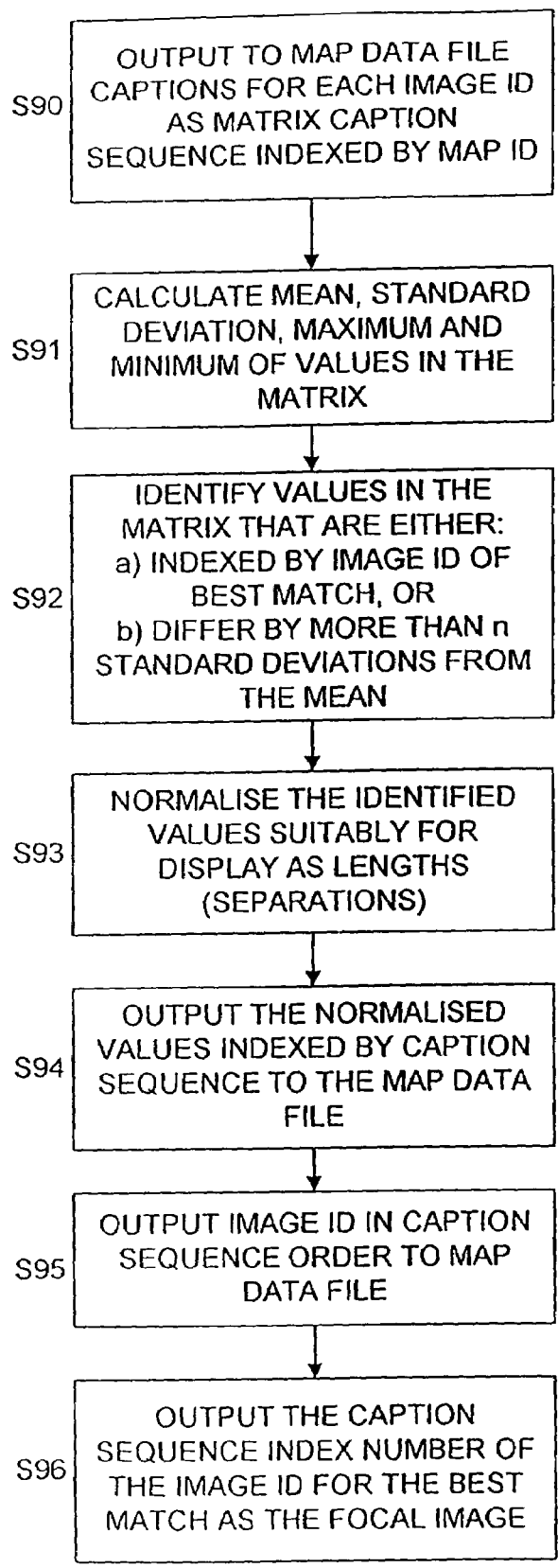
FIG. 12 is a flow diagram illustrating the method of calculating map data on line.

A second embodiment to the present invention will now be described with reference to FIGS. 10 to 12.

Figure 10:
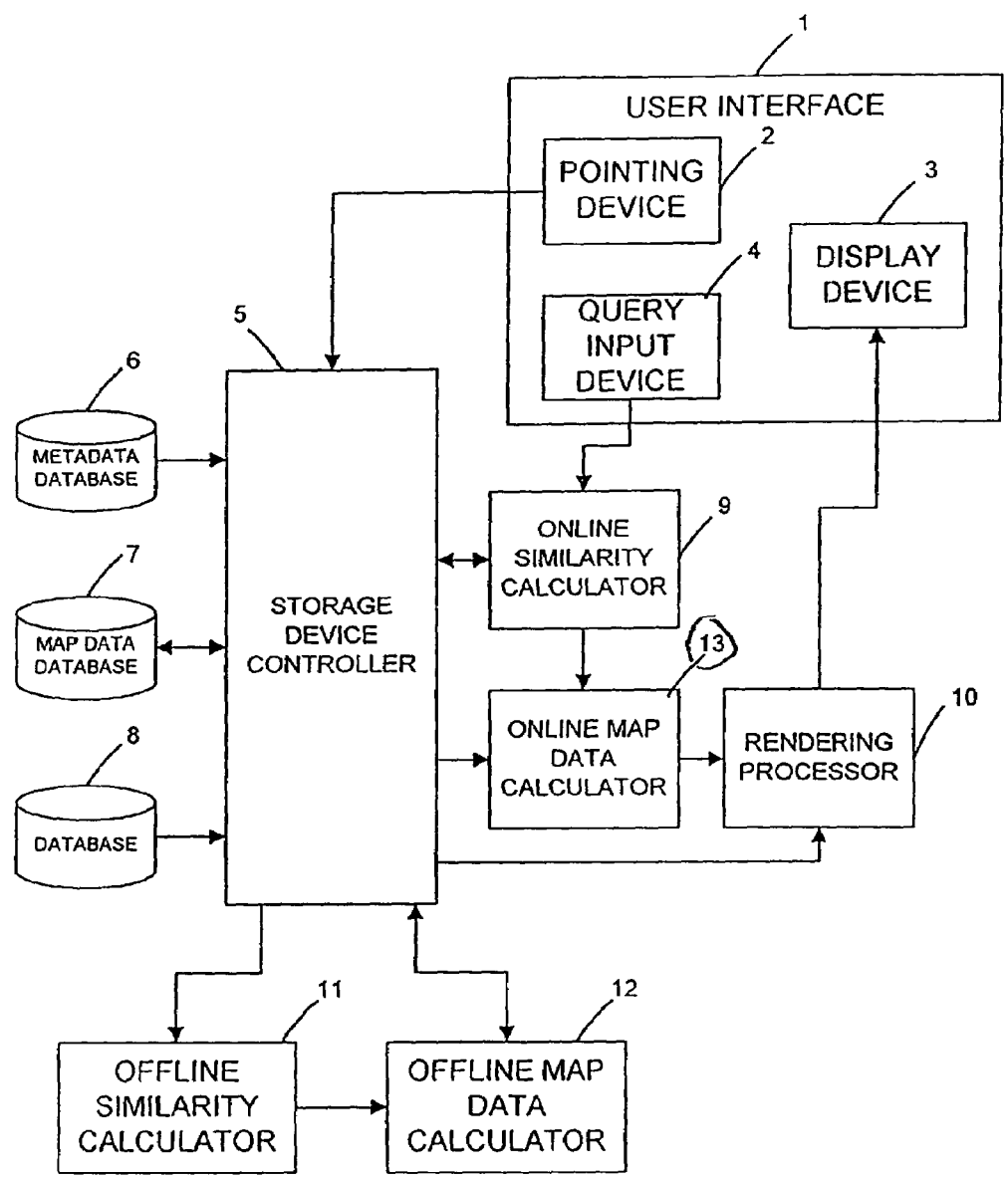
FIG. 10 is a schematic functional diagram of a second embodiment of the present invention.

FIG. 10 is a schematic diagram of the second embodiment of the present invention.

Figure 3:
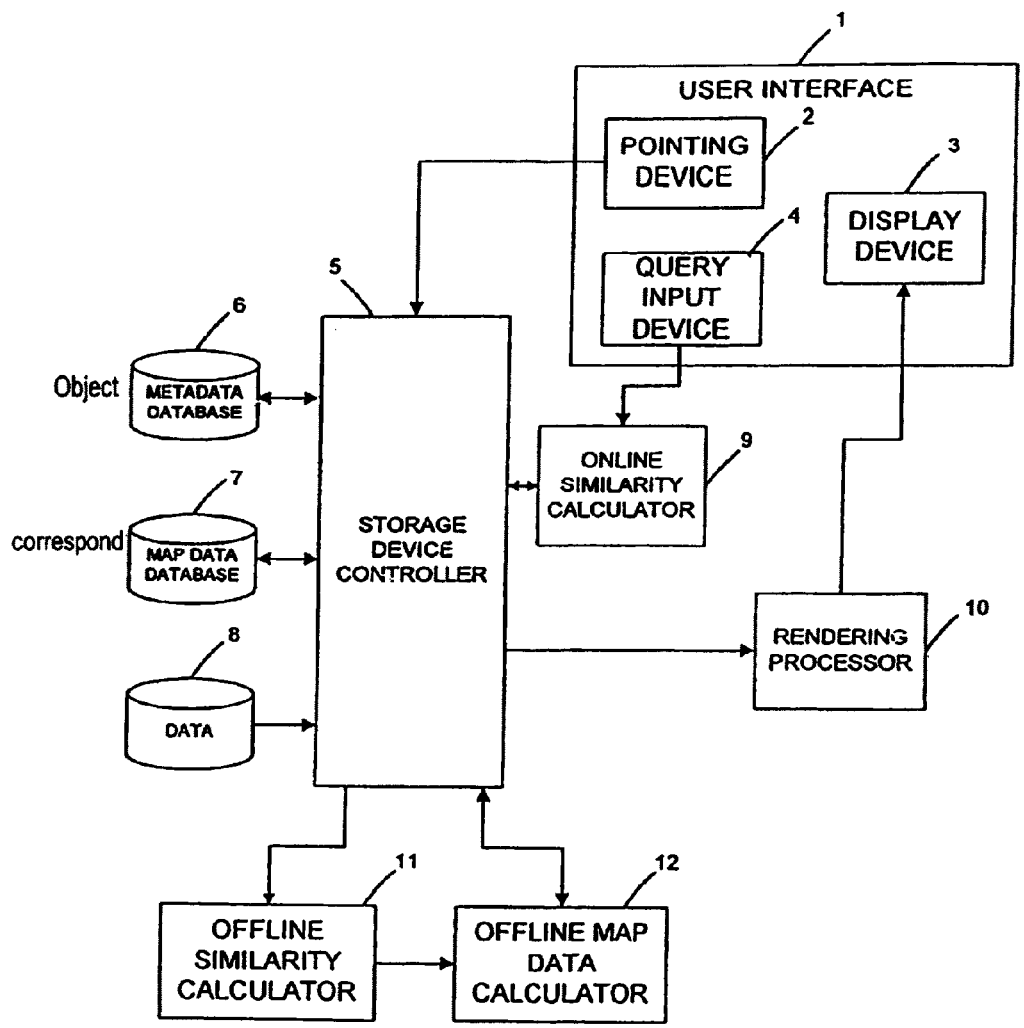
FIG. 3 is a schematic functional diagram of an embodiment of the present invention.

Many of the functional components of the second embodiment are similar to the functional components of the first embodiment as illustrated in FIG. 3 and thus the same reference numerals are used. In this embodiment the interface 1 comprises the pointing device 2 the query input device 4 and the display device 3. When a query is input, the on-line similarity calculator 9 not only determines the best match between the input query and the meta data in the meta data database 6, it also calculates the N best matches between the input query and the data in the meta data database 6. This is used to calculate similarity values between the input query and the N best matches. The similarity data is then passed to an on-line map data calculator 13 for calculating map data on-line from the similarity values. The map data calculator 13 refers to the meta data database 6 and the data in the database 8 in order to form the map data. This data is then passed to the rendering processor 10 in order to render a map in the map window 107 in a similar manner to that shown in FIG. 1.

In this embodiment, the off-line similarity calculator 11 and the off-line map data calculator 12 operates as in the first embodiment to generate map data for the map data database 7. This data is used whenever the pointing device 2 is used to select an image. In other words when an image is selected there is no need to perform any matching operation on-line and it is possible to retrieve the map data simply using the ID of the selected image. However, when a user inputs a query, the map data generated is not based on similarity to an entry in the database, but instead is based on similarity to the query.

The operation of the second embodiment of the present invention will now be described with reference to FIG. 11 which is a flow diagram illustrating the overall operation.

In step S70, captions for the image database are created and in step S71 they are stored in the database. In step S72 similarity matrices are generated in accordance with the flow diagram of FIG. 6 and in step S73 off-line map data is generated in accordance with the flow diagram of FIG. 7 as in the previous embodiment. In step S74 the map data is stored in the database. Steps S72 to S74 comprise off-line processing and are the same as in the first embodiment.

When a query is input in step S75, in step S76 the N best matching captions are found and in step S77 a similarity matrix is generated on line. This comprises the determination of the similarity between the N best matches to the input query. In step S78 map data is generated from the similarity matrix. The map data is generated on-line. This will be described in more detail with reference to FIG. 12 hereinafter. The map data is then rendered in step S79 and the process then awaits a mouse input in step S80. Steps S81 to step S88 correspond to steps S11 to S18 in FIG. 5 and the process operates in the same way as in the first embodiment for mouse inputs. A description of steps S81 to S88 is thus omitted for the sake of brevity. Thus the second embodiment only differs from the first embodiment in that steps S7 to S9 are replaced with steps S76 to S79.

The method of generating map data will now be described with reference to FIG. 12. In step S90 the captions for each image ID in the similarity matrix are output as a matrix caption sequence indexed by map ID. In step S91 the mean, standard deviation, maximum and minimum of the values in the matrix are then calculated. In step S92 significant values in the matrix are then identified either by the fact that they are indexed by the image ID of the best match, or by the fact that they differ by more than n standard deviations from the mean. These values are then normalised suitably for display as lengths (separations) in step S93. The normalised values are then output indexed by caption sequence to the map data file in step S94 and in step S95 the image ID in caption sequence order is output to the map data file. Finally, the caption sequence index number of the image ID for the best match is output as the identification of the focal image in step S96.

This embodiment of the present invention allows a user to enter a query and observe a map of images which most closely match the query. The process does however require the determination of a similarity matrix and map data on-line. Once the map is rendered a user is able to navigate the image database in the same manner as for the first embodiment.

Modifications to the Embodiments

The present invention has been described hereinabove with reference to two specific embodiments, the present invention is not limited to these embodiments and modifications can be made within the spirit and scope of the present invention.

In particular, the present invention is not limited to the searching of image data. The present invention is applicable to any form of data such as text data, audio data, image data, and video data. When video data is searched, the rendered map can include images representative of a frame with a video. Alternatively, a specific thumbnail image of a frame can be provided as meta data to the video data. Similarly, for audio data, meta data can be provided which can comprise text. For text data, the thumbnail images can comprise an image of a document, an abstract, or a caption. Thus the present invention is applicable to any form of data wherein the rendering process generates a map having nodes which comprise representations for the data.

When a node in the map is selected, the information outputting process will depend upon the form of the data. For example, in the above embodiments, for image data, when an image is selected, the size of the thumbnail is increased. This can also take place for the representation of data in other forms. Alternatively, for audio data and for video data, at least some of the audio or video can be played back.

Although in both embodiments, the searching is performed using meta data on the form of captions for images, the present invention is applicable to searching of any form of meta data or the data itself. For example, where the database contains text data to be searched, the query can be matched to the data itself, e.g. the title, the abstract or the whole text, or to meta data such as a document title, file name, abstract or caption which is extraneous to the data itself.

In the embodiments, natural language queries or keyword queries have been used, the present invention is not limited to such queries. Any form of query can be used for searching the database. For example, where colour images are being searched, colour data or signatures can be used as an input query.

In the embodiments described, the similarity measure used for determining the similarity between each of the images is based on a natural language matching process between the natural language query and the caption or between the captions themselves. The present invention is not however, limited to any particular form of similarity measure. For example, the similarities between images can be based on the colour content of the images. Similarity between videos i.e. films can be based on the content of the film e.g. the genre of the film.

In the embodiments the matching process to form the similarity measure is described as using the natural language matching procedure described in UK Patent Application 9904662 and UK Patent Application No. 9821969 the content of which are hereby incorporated by reference. The invention can use any form of matching technique such as the cosine measure in order to determine how well things match. Using a natural language or keyword query together with captions or text in documents, the cosine measure can be used by considering each word in the query to comprise a dimension. Thus the query comprises a N-dimensional vector having values in each of the dimensions. The caption is mapped onto the N-dimension space and if the caption includes any of the words it is assigned a unit value in the particular dimension. Where no word is present it is assigned a zero value in a particular dimension. In this way, the caption and the query can be considered as N-dimensional vectors and a cosine measure can be obtained as a measure of the similarity between the query and the caption.

In the embodiments, the links are shown as simple links between nodes in the map. The links can however be considered to be two different types of links:

1. Links for which the similarity is high wherein the nodes are attracted, and
2. Links for which the similarity is low wherein nodes which are repelled.

Links which have values close to the mean are not mapped. Thus the two different types of link can be shown in different colours to show links which are pushing and pulling nodes. Further, where additional information is available regarding the similarity between the images, this can be used to identify the types of links between the images e.g. for natural language queries and natural language matching, the context of the match can be used to enhance the information available for the link. Such context information can be made available from implementing the technique in UK Patent Application No. 9904662.

The invention has many applications and can be used for searching for and browsing through information and databases. The present invention is not limited to the retrieval of data and can be used for browsing for information even for placing requests for information. For example, the present invention can be applied to on-line shopping for searching for and ordering items, and for video-on-demand systems. In such systems the thumbnail images can comprise images of the items that a user wishes to order. The present invention is also applicable to web search engines where the images displayed in the map can comprise images of the web pages. For natural language queries to allow the searching on such web pages, the captions can either be matched to the text content of the web page, or meta data for the web pages can be provided e.g. captions.

The embodiments of the present invention have been described with reference to implementation over a network using Java applets. This implementation of the present invention is particularly convenient since it allows the invention to be implemented using a browser either locally on a machine wherein the client and server effectively comprises a single machine and the searching takes place of a database stored locally on a single machine, or the technique can be applied to allow searching of databases over a network. The present invention is not however limited to the specific implementation and it can be implemented either using specifically designed software or hardware. Since the present invention can be implemented in software, the present invention can be embodied as a storage media carrying computer code for controlling a processor to carry out the method. Also, because the computer program can be downloaded over a network such as the internet or a local area network, the present invention can be embodied as a signal carrying instructions for controlling a processor to carry out the method.

The invention defined in the appended claims can comprise any combination of the claims and features in the claims. Also, although various means for performing functions are claimed, the means can be provided in combinations.

I claim:

1. Data display apparatus for displaying relationships between data sets in a group of data sets resulting from a query, the apparatus comprising:
    selecting means for selecting a target data set from the group of data sets obtaining means for obtaining similarities between pairs of unselected ones of the data sets in the group of data sets; and
    display control means for controlling positions for display of representations of the unselected data sets on a display screen, wherein the representations of the unselected data sets are positioned around a representation of the target data set on the screen based on similarity to the target data set, and wherein the representations of the unselected data sets are spaced in visual proximity to each other based on the similarities between the pairs of unselected data sets.

2. Data display apparatus according to claim 1, wherein the data sets represent images and said display control means is adapted to control the display means to cause the display screen to display the images as the representations thereof.

3. Data display apparatus according to claim 1, wherein the obtaining means is operable to obtain the similarities by obtaining similarity values representing the similarity between the target data set and the unselected data sets in the group, and wherein said display control means is adapted to control said display means to cause the display screen to display links between representations and to cause the display screen to display a link in a first style if the similarity value associated with the link is above the mean of the similarity values by a predetermined amount and to display a link in a second style if the similarity value associated with the link is below the mean of the similarity values by a predetermined amount.

4. Apparatus according to claim 1, further comprising:
    query receiving means for receiving an input query; and
    determining means for determining similarities between the input query and data representing the group of data sets.

5. Apparatus according to claim 4, wherein said determining means comprises accessing means for accessing a database and comparing means for comparing the input query with the data representing the group of data sets to determine the similarities.

6. Apparatus according to claim 4, wherein said query receiving means is arranged to receive a textual input query and said determining means is arranged to determine similarities between the textual input query and descriptive caption data representing the data sets.

7. Apparatus according to claim 4, wherein said determining means comprises accessing means for accessing a database and comparing means for performing a natural language comparison between the input query and descriptive caption data representing the data sets to determine the similarities.

8. Apparatus according to claim 7, wherein said comparing means is adapted to compare a meaning of the input query with a meaning of the caption data.

9. Apparatus according to claim 4, wherein said display control means is adapted to select a representation of the data set determined to be most similar to the input query as a focal representation, and to control the display means to display representations of at least some others of the group of data sets around the focal representation at distances dependent upon the determined similarities.

10. Apparatus according to claim 4, further comprising means for receiving a selection signal following selection of one of the representations as a new query, said display control means being responsive to the selection signal to control the display means to display the selected representation at a central position and to display the representations for the data sets most similar to the selected representation around the selected representation at distances in accordance with the similarities.

11. Apparatus according to claim 1, wherein said display control means is adapted to control said display means to display thumbnail images representing said data sets as the representations.

12. A data display method of displaying relationships between data sets in a group of data sets resulting from a query, said method comprising the steps of:
    accepting a selection of a target data set from the group of data sets;
    obtaining similarities between pairs of unselected ones of the data sets in the group of data sets; and
    controlling positions for display of representations of the unselected data sets on a display screen, wherein the representations of the unselected data sets are positioned around a representation of the target data set on the screen based on similarity to the target data set, and wherein the representations of the unselected data sets are spaced in visual proximity to each other based on the similarities between the pairs of unselected data sets.

13. A data display method according to claim 12, wherein the data sets represent images and the controlling step controls the display means to cause the display screen to display the images as the representations thereof.

14. A data display method according to claim 12, wherein the similarities are determined by obtaining similarity values representing the similarity between the target data set and the unselected data sets in the group, and wherein the controlling step causes the display screen to display links between representations with a link being displayed in a first style if the similarity value associated with the link is above the mean of the similarity values by a predetermined amount and to display with a link being displayed in a second style if the similarity value associated with the link is below the mean of the similarity values by a predetermined amount.

15. A method according to claim 12, further comprising the steps of:
    receiving an input query; and determining similarities between the input query and data representing the data sets.

16. A method according to claim 15, wherein said determining step comprises the steps of accessing a database and comparing the input query with the data representing the data sets to determine the similarities.

17. A method according to claim 15, wherein a textual input query is received in said input query receiving step, and similarities between the textual input query and descriptive caption data representing the data sets of are determined in said determining step.

18. A method according to claim 15, wherein said the determining step comprises the steps of accessing the database and performing a natural language comparison between the input query and descriptive caption data representing each data set to determine the similarities.

19. A method according to claim 18, wherein a meaning of the input query is compared with a meaning of the caption data in said performing step.

20. A method according to claim 15, wherein in said controlling step, the representation of the data set determined to have the most similarity to the input query is selected as a focal representation, and wherein representations of at least some others of the group of data sets are displayed around the focal representation at distances dependent upon the determined similarities.

21. A method according to claim 15, further comprising the steps of receiving a selection signal following the selection of one of the representations as a new query and, in response to the selection signal, controlling the display screen to display the selected representation at a central position and to display the representations for the data sets most similar to the selected representation around the selected representation at distances in accordance with the determined similarities.

22. A method according to claim 12, wherein in said controlling step, the display screen is controlled to display thumbnail images of the data sets as the representations.

23. A computer-readable storage medium storing computer-executable instructions for controlling a processor to carry out a method according to claim 12.

24. Data display apparatus for displaying relationships between a group of data sets, the apparatus comprising:
selecting means for selecting a target data set from the group of data sets;
determining means for determining a similarity between each of the other data sets in the group and the target data set;
display control means for controlling display means to cause a display screen to display representations of the target data set and at least some of the other data sets in the group;
and relative location determining means for determining the relative locations on the display screen of each of second representations representing the at least some of the data sets and a first representation representing the target data set, the relative location determining means being operable, for each of the second representations, to control an x coordinate and a y coordinate of the relative location of the second representation on the display screen in accordance with the similarity between the data set represented by that second representation and the target data set so as to produce on the display screen a two-dimensional arrangement, wherein in the two-dimensional arrangement with the second representations are positioned relative to each other based on similarity between the data sets represented by the second representations and are positioned around the first representation with the x and y coordinates of the relative location of each second representation being determined by the similarity between the data set represented by that second representation and the target data set.

25. Data display apparatus according to claim 24, wherein the data sets represent images and said display control means is adapted to control the display means to cause the display screen to display the images as the representations.

26. Data display apparatus according to claim 24, wherein the relative location determining means is operable to determine the relative locations such that the representation representing the target data set is at a central focus of the representations on the display screen.

27. A data display method of displaying relationships between a group of data sets, said method comprising the steps of:
selecting a target data set from the group of data sets;
determining a similarity between each of the other data sets in the group and the target data set;
controlling display means to cause a display screen to display representations of the target data set and at least some of the other data sets in the group;
and determining the relative locations on the display screen of second representations representing the at least some of the data sets and a first representation representing the target data set by, for each of the second representations, controlling an x coordinate and a y coordinate of the relative location of the second representation on the display screen in accordance with the similarity between the data set represented by that second representation and the target data set so as to produce on the display screen a two-dimensional arrangement, wherein in the two-dimensional arrangement the second representations are positioned relative to each other based on similarity between the data sets represented by the second representations and are positioned around the first representation with the x and y coordinates of the relative location of each second representation being determined by the similarity between the data set represented by that second representation and the target data set.

28. A data display method according to claim 27, wherein the relative locations are determined such that the representation representing the target data set is at a central focus of the representations on the display screen.

* * * * *

UNITED STATES PATENT AND TRADEMARK OFFICE
CERTIFICATE OF CORRECTION

PATENT NO. : 7,028,050 B1
APPLICATION NO. : 09/523313
DATED : April 11, 2006
INVENTOR(S) : Tony Gerard Rose It is certified that error appears in the above-identified patent and that said Letters Patent is hereby corrected as shown below:

<u>TITLE PAGE</u>:
(56) References Cited, OTHER PUBLICATIONS (page two),
After "An Atlas": "Cyperspace." should read -- Cyberspace." --; and
After "Data Mountain:": "t al.," should read -- et al., --.

<u>DRAWINGS</u>:
Sheet 4, Figure 4, "APPLICATIO should read -- APPLICATION --.
                      N"

<u>COLUMN 1</u>:
Line 47, "M Zizi" should read -- M. Zizi --; and
Line 49, "and A" should read -- and A. --

<u>COLUMN 2</u>:
Line 5, "Y Rubner" should read -- Y. Rubner --.

<u>COLUMN 3</u>:
Line 36, "users" should read -- user's --.

<u>COLUMN 4</u>:
Line 22, "which:–" should read -- which: --.

<u>COLUMN 5</u>:
Line 42, "highlighted" should read -- highlighted in --.

<u>COLUMN 9</u>:
Line 16, "by a selecting" should read -- by selecting --.

<u>COLUMN 10</u>:
Line 4, "comprise" should read -- comprises --; and
Line 15, "generate" should read -- to generate --.

<u>COLUMN 13</u>:
Line 47, "substraction" should read -- subtraction --; and
Line 51, "substraction," should read -- subtraction, --.

<u>COLUMN 14</u>:
Line 31, "operates" should read -- operate --.

<u>COLUMN 15</u>:
Line 53, "on" should read -- in --.

UNITED STATES PATENT AND TRADEMARK OFFICE
CERTIFICATE OF CORRECTION

PATENT NO. : 7,028,050 B1
APPLICATION NO. : 09/523313
DATED : April 11, 2006
INVENTOR(S) : Tony Gerard Rose It is certified that error appears in the above-identified patent and that said Letters Patent is hereby corrected as shown below:

COLUMN 16:
Line 21, "a N-dimensional" should read -- an N-dimensional --; and
Line 35, "which" (second occurrence) should be deleted.

COLUMN 17:
Line 2, "comprises" should read -- comprise --.

COLUMN 18:
Line 61, "to display" should be deleted.

COLUMN 19:
Line 10, "of" should be deleted; and
Line 12, "the" should be deleted.

COLUMN 20:
Line 7, "with" should be deleted.

Signed and Sealed this

Twenty-sixth Day of June, 2007

JON W. DUDAS
*Director of the United States Patent and Trademark Office*